United States Patent
Sculati et al.

[11] 3,852,005
[45] Dec. 3, 1974

[54] APPARATUS FOR MOLDING RUBBER

[75] Inventors: Marvin Americo Sculati; John Cornelius Gaynor, both of Dublin, Ga.

[73] Assignee: Uniroyal, Inc., New York, N.Y.

[22] Filed: July 25, 1973

[21] Appl. No.: 382,414

Related U.S. Application Data

[62] Division of Ser. No. 203,697, Dec. 1, 1971, abandoned.

[52] U.S. Cl. ............ 425/119, 425/129 S, 425/216, 425/406, 264/244
[51] Int. Cl. ........ B29c 9/00, B29f 1/12, B29h 3/14, B29h 7/08
[58] Field of Search ........ 425/119, 120, 129 S, 215, 425/216; 249/105; 18/30 US, 36, 42, 14, 34 S

[56] References Cited
UNITED STATES PATENTS

| | | | |
|---|---|---|---|
| 2,994,920 | 8/1961 | Patera | 249/105 |
| 3,051,995 | 9/1962 | Farell et al. | 425/129 S X |
| 3,160,921 | 12/1964 | Ludwig | 425/119 X |
| 3,306,964 | 2/1967 | Miller | 425/119 X |
| 3,499,190 | 3/1970 | Ludwig | 425/129 S X |
| 3,751,200 | 8/1973 | Borisuck et al. | 425/119 |

Primary Examiner—J. Howard Flint, Jr.
Attorney, Agent, or Firm—Robert J. Patterson, Esq.

[57] ABSTRACT

A method and apparatus for molding a rubber article from rubbers of two colors. Unvulcanized rubber is placed in a mold cavity. A movable mold member is advanced to spread and compress the rubber which is held in its spread condition until it is vulcanized.

The movable member is provided with a peripheral outwardly extending lip for forming, in the rubber flash escaping around the periphery of the mold member, a peripherally extending weakened region. A peripherally extending recess region is also provided adjacent the lip for forming the flash rubber escaping past the lip into the base.

After the first rubber has partially set and become vulcanized, the movable mold member is retracted away from the partially set rubber entrained therewith the bead formed in the recessed region thereof and thus tearing the rubber flash along the weakened region. The retraction of the movable mold member continues sufficient to expose a compressed gas inlet through which compressed gas is introduced to blow out through a gas outlet any particles of rubber which were formed during the severing of the rubber flash along the weakened region.

After the mold cavity has been so cleaned, a second rubber is introduced into the mold cavity and the movable mold member is moved to spread the second injected rubber and to press it up against the partially set first injected rubber.

5 Claims, 6 Drawing Figures

PATENTED DEC 3 1974　　　　　　　　　3,852,005

APPARATUS FOR MOLDING RUBBER

This is a division of application Ser. No. 203,697, filed Dec. 1, 1971, now abandoned.

BACKGROUND OF THE INVENTION

1. Field of the Invention

This invention relates to the molding of rubber and particularly to the molding of a two color rubber soled article of footwear.

2. Related Applications

The present invention is related to and constitutes a modification of U.S. Pat. application Ser. No. 863,652 filed Oct. 3, 1969, which in turn constitutes a modification of U.S. application Ser. No, 729,570 filed May 16, 1968, now U.S. Pat. No. 3,608,004. Both of these applications have been assigned to the assignee of the present invention, and are hereby incorporated by reference in their entirety.

DESCRIPTION OF THE PRIOR ART

One of the main purposes of the improvements described in said copending application Ser. No. 863,652, was to provide a novel method and apparatus for insuring that two differently colored rubber materials which are used to form the sole of an article of footwear have a sharp well defined boundary between them. The problem in obtaining such a boundary has been that the two rubbers have a tendency to mix during the injection of the second or outsole rubber into the mold cavity.

To overcome this problem, it was proposed in said application Ser. No. 863,652 to provide a mold including means for holding an upper of an article of footwear, whereby to define a part of a mold cavity, the remainder of the mold cavity being defined by a ring means 12 defining the outer periphery of the sole and a movable sole plate which serves to spread and compress rubber once introduced into the mold cavity. In said application Ser. No. 863,652, the ring means was provided with a pair of ports for introducing the two differently colored rubbers. The ports are spaced apart in the direction of travel of the movable sole plate. When the first rubber was introduced and the movable sole plate was moved toward the upper to spread that first rubber and press it against the bottom of the upper to form the first layer of the sole (i.e., midsole) of the article of footwear, flash would invariably form and move around the edge of the movable sole plate and down along the inside wall of the ring. In accordance with the invention of application 863,652, this flash was trapped in a groove in the periphery of the movable sole plate to form a bead connected to the midsole by a narrow tearable or weakened portion. After the midsole was so formed and was permitted to at least partially set, the sole plate would be moved away from the midsole to provide a space for the second or outsole rubber. In effecting this movement, the bead formed of the first rubber would be entrained in the groove in the sole plate and would be separated from the remainder of the partially set first rubber by tearing the weakened lip of flash to provide a sharp line of demarcation between the midsole and the yet to be formed outsole. The bead would also provide a good seal during the formation of the second layer of rubber to reduce flash from the second layer.

However, in tearing the weakened portion, it has been found that from time to time some of the weakened portion is torn into fragments or small pieces rather than adhering either to the bottom of the midsole or to the bead entrained in the sole plate. These fragments have been found to get mixed in with the second rubber when it is injected whereby to contaminate the color of that second rubber.

It is therefore an object of the present invention to eliminate all free or loose particles of one colored rubber from the mold cavity of an apparatus for forming a two color sole for an article of footwear prior to the injection of the second colored rubber into the mold cavity.

SUMMARY OF THE INVENTION

A mold cavity for forming a two color sole for an article of footwear is defined by an outer ring which defines the peripheral configuration of the sole, and a sole plate that is movable to and from a retracted position to maximize the size of the mold cavity and from and to a compressed condition in which it is up against the article of footwear being formed. Provided in the ring are three inlets spaced apart in the direction of travel of the sole plate, the one closest to the location for the article of footwear being formed being provided for injection of the first or midsole rubber, the second spaced somewhat further from the location of the article of footwear in formation being provided for injection of the second or outsole rubber, and the third and most remote opening being for introduction of a compressed gas such as compressed air. Disposed remotely across the mold cavity from said third or compressed gas inlet and at the same level is a compressed gas outlet.

The sole plate is formed with a peripherally extending groove which is disposed beneath a lip that will define a weakened or frangible portion of rubber flashing from the injection and compression of the first rubber.

The apparatus of the present invention comprises injecting through the first inlet the first rubber for the foxing or midsole in a predetermined quantity which is then distributed over the bottom of the upper and pressed thereagainst by moving the sole plate as close to the upper as the midsole rubber will permit, where it is held until it sets sufficiently to enable a relatively clean retraction of the sole plate without any sticking between the upper surface of the sole plate nad the bottom of the now formed insole. During this compression step some flashing of first rubber is formed which flashing flows down around the peripheral edge of the sole plate and into the peripheral groove thereof whereby to form a bead connected to the midsole by a frangible or weakened region.

Thus, when the sole plate is moved away from the midsole after the midsole has set sufficiently, the peripherally extending bead is separated from the midsole at the weakened region and thereafter provides a good seal against flash from the second rubber to be injected. Moreover, substantially all of the flash from the first injected rubber is thus removed from the midsole and thus yields a relatively sharp line of demarcation between the midsole and the second or outer sole rubber. However, irrespective of how clean the separation may be, there are some particles of first rubber formed by the tearing of the weakened portion of the flash and by the rubbing of the bead against the mold cavity wall, and these particles are loose and entrapped within the mold cavity. To remove these loosened particles, the sole plate is moved sufficiently downwardly, that is away from the bottom of the midsole, to expose the gas inlet and outlet whereupon compressed air is introduced into the mold cavity to blow out through the outlet any loose fragments of first rubber. Then the outsole or second rubber is introduced through the second rubber inlet and the sole plate is once again moved towards the article of footwear being formed, whereby to spread out the second rubber and compress it against the first rubber where it is held until it sets sufficiently to adhere to the midsole and to be cleanly separated from the sole plate.

In a modification of the above described apparatus, just prior to the introduction of the second rubber, the sole plate may be moved up towards the midsole beyond the compressed gas inlet and outlet (but not beyond the second rubber inlet) whereby to seal them off from the second rubber prior to its introduction into the mold cavity.

DESCRIPTION OF THE PREFERRED EMBODIMENTS

Figure 6:
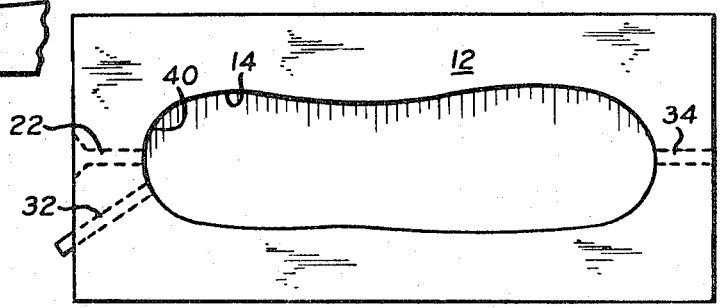
FIG. 6 is a top plan view of the ring of the apparatus.

Referring now to the drawing in detail, the molding apparatus 10 of the present invention comprises a ring 12 which, as best seen in FIG. 6, has a rectangular outer periphery and an inner central passage or wall 14 in the shape of the sole to be formed. Slidably interfitted within the ring in close confronting relating with the wall 14 is a sole plate 16 that is movable vertically by means of a piston and cylinder arrangement 18 well known to those skilled in the art. By means of operation of the piston and cylinder 18, the sole plate 16 can be moved from a fully retracted position shown in solid lines in FIG. 1 to a fully compressed position shown in FIG. 2 in which it is in closely spaced relation with the bottom of a lasted upper 20 that is mounted in the ring 12 by means well known to the skilled art worker.

Ring 12 is provided with four passages. The first passage, passage 22, extends horizontally through the ring to the interior which will hereinafter be referred to as mold cavity 24, the mold cavity being defined by the internal ring wall 14, the upper surface 26 of the sole plate 16, and the bottom of the article of footwear being formed, whether that bottom be the bottom of the lasted upper 20 or the bottom of a midsole 28 to be formed during the process of this invention.

Ring 12 is provided with a second passage 30 for introducing the second or outsole rubber, a third passage 32, which as shown comes in at an angle to the passages 22 and 30, although it could be in alignment therewith which passage 32, is connected to a source of compressed air (not shown) preferably through a suitable valve means for controlling the flow of compressed air which valve means is also not shown. Lastly, a fourth passage 34 is provided in ring 12, which fourth passage is preferably coplanar with and across the mold cavity from the compressed air inlet passage 32, whereby to insure that when compressed air is introduced through the air inlet 32, it will sweep through the entire mold cavity 24 and thence out through the compressed air outlet 34.

As was described in detail in U.S. Pat. application Ser. No. 863,652, sole plate 16 is provided with a peripherally extending groove 36 which is formed in the side surface 38 of the sole plate. Groove 36, which preferably, although not necessarily, has a semicircular cross-section, opens outwardly in the direction of the inner ring wall surface 14. A sliding fit is provided between the peripheral surface 38 of the sole plate 16 and the inner wall 14 of the ring 12. Thus the sole plate may slide freely within the ring 12 toward and away from the lasted upper 20. (The spacing between the relatively slidable surfaces 38 and 14 is shown exaggerated in FIGS. 2 through 5 inclusive to facilitate an understanding of the invention.) The upper surface 26 of sole plate 16 has a peripherally extending edge portion 42 preferably inclined at an angle in the range of about 18° to 70° with respect to the vertical. The peripheral surface 38 of sole plate 16 includes a lip 44 (FIG. 5) which is formed between the groove 36 and the tapered surface 42 and preferably extends continuously about the periphery of the sole plate 16 toward and into close proximity with the inner wall 14 of the ring 12.

In use, with sole plate 16 located below the level of inlet 22, and preferably above inlet 32, the first or midsole rubber is introduced or injected into the mold cavity through inlet 22 by means well known to the skilled art worker. Then the sole plate 16 is moved toward the lasted upper 20. As the sole plate 16 is moved upwardly toward the lasted upper 20 to apply the first injected rubber thereto and thus form midsole 28, the flash produced by this action, that is the rubber which escapes around the periphery 38 of the sole plate 16 into the small space between the relatively sliding sole plate edge 38 and the ring wall 14 finds its way past the lip 44 and into the semicircular groove 36 to define a bead, as is the purpose of the groove 36.

Figure 2:
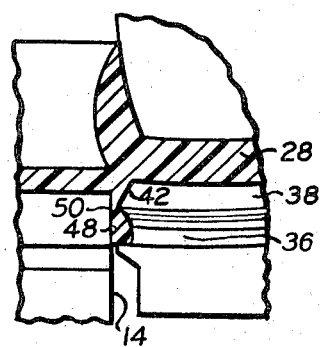
FIG. 2 is a fragmentary view, partly in vertical section and partly in elevation, and of enlarged scale when compared with FIG. 1, of the heel region of the apparatus of FIG. 1 showing in detail the condition of the injected material and features of the apparatus of the invention when the sole plate has been advanced toward the lasted upper to spread the midsole foxing component against the upper.

The sole plate 16 is held in the position illustrated by FIG. 2 until the first rubber forming the midsole 28, the bead 48 and the weakened connecting portion 50 therebetween are set sufficiently so that the midsole 28 will be vulcanized to the lasted upper 20 as well as will permit a clean separation of the upper surface 26 of sole plate 16 from the bottom surface of the now formed midsole 28. This downward or retraction movement of the sole plate will cause the rubber bead 48 to be separated from the midsole 28 along the weakened portion 50 which will permit the bead 48 to remain entrained by the sole plate groove 36 and pulled downwardly therewith. However, this separation at the weakened portion 50 and the rubbing movement of the bead 48 against the ring 14 will cause some loose fragments of the first rubber to be formed and lie loosely within the mold cavity 24.

In order to remove these loosened first rubber particles from the mold cavity prior to injection of the second rubber into the mold cavity to thus prevent contamination of the second rubber, the sole plate 16 is moved downwardly by the piston and cylinder means 18 to the position shown in solid lines in FIG. 1 (as well as in FIG. 3) below the plane of the compressed air inlet 32 and the compressed air outlet 34. In that position the sole plate may come to a rest and by valve means or by other means well known to those skilled in the art, compressed air is introduced through the compressed air inlet port 32 into the mold cavity and vented out through the compressed air outlet port 34. The compressed air moves through the mold cavity with sufficient velocity to entrain the loose particles of first rubber that are in the mold cavity and to remove those particles from the mold cavity through the outlet port 34. The condition of the apparatus during the air cleaning step may best be seen in FIG. 3.

While any suitable air velocity may be employed it has been found that a satisfactory cleaning action is achieved when compressed air at 80psi is fed through an inlet port of ⅛ inch diameter, the outlet port 34 being of the same diameter. However, it is preferred that the air pressure on the ⅛ inch line be aout 130psi.

Figure 3:
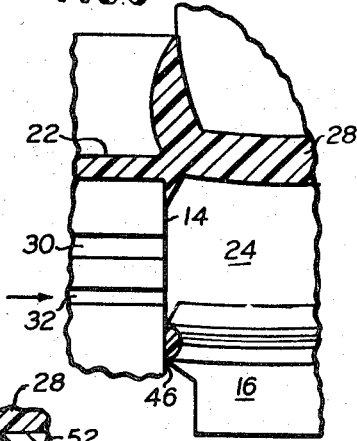
FIG. 3 is a view similar to FIG. 2 but showing the sole plate in fully retracted position after separation from the midsole foxing component, the apparatus being in condition for cleaning the mold cavity.
Figure 5:
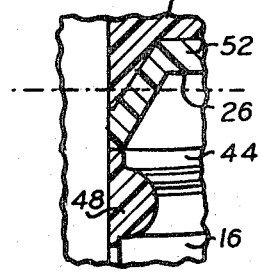
FIG. 5 is a fragmentary view of the apparatus in the immediate region where the sole is being formed showing on an enlarged scale the details of the lip and groove construction of the apparatus and the condition of the injected materials after the second or outsole rubber have been injected.

After completion of the cleaning step, and in accordance with one embodiment of the present invention, with the sole plate 16 still in the position shown in FIG. 3, the second or outsole rubber is introduced into the mold cavity 24 through the second or outsole rubber inlet port 30, the piston and cylinder mechanism 18 is then operated to move the sole plate 16 from the fully retracted position of FIG. 3 to the position of FIG. 5 whereby to spread the second rubber 52 over the outer surface of the midsole 28 and to hold the rubber 52 in such condition until it sets sufficiently to permit a clean separation between the upper surface 26 of the sole plate 16 and the bottom of the now formed outsole 52. During this step of compressing the outsole 52, there is little danger of flash being formed by the second rubber as the bead 48 of first rubber serves as a seal to prevent any significant amount of flash forming during the second compression step. Thus when the sole plate 16 is retracted a second time a completed two rubber soled article of footwear is formed with no blending of color and with no color imperfections or spots in the outer sole caused by the presence of inclusions of first rubber therein.

Figure 1:
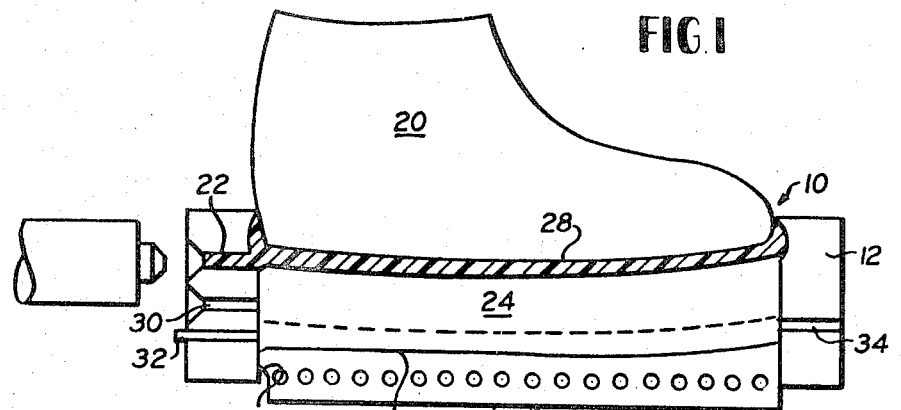
FIG. 1 is a schematic representation of the apparatus for forming a two color rubber sole on a lasted upper, the article of footwear being formed being shown with the midsole foxing component against the upper.
Figure 4:
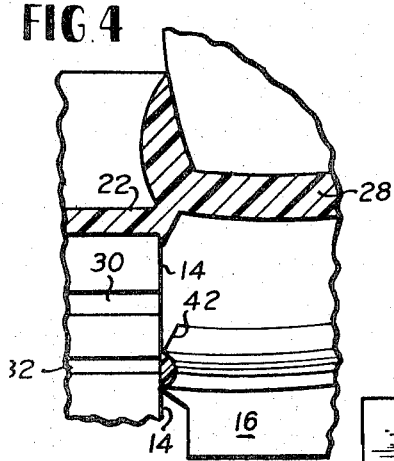
FIG. 4 is a view similar to FIGS. 2 and 3 but showing the sole plate advanced back towards the lasted upper after the mold cavity has been cleaned.

An alternative form of use of the apparatus of FIG. 1 is illustrated in FIG. 4 wherein, after the blowing out of the mold by the introduction of compressed air as illustrated in FIG. 3, but before the introduction of the second or outsole rubber, the piston and cylinder mechanism 18 is actuated to move the sole plate 16 upwardly past the compressed air inlet 32 but below inlet 30, where the sole plate comes to rest. Then the second or outsole rubber is injected into the mold cavity 24 through the unobstructed inlet port 30 and the sole plate is then moved upwardly towards the midsole 28 in accordance with the previously described method.

However, in the alternative form of method being presently described, it will be obvious that by moving the sole plate up beyond the compressed gas inlet and outlet ports prior to injection of the second rubber into the mold cavity 24, a reasonable insurance against the clogging of the compressed air inlet and outlet ports is achieved.

After the second injection-compression molding step by either of the two alternative methods has been completed, and following sufficient time for cure, the mold components will have the relative positions shown in FIG. 5. When the entire cycle is completed the ring 12 is retracted and the complete shoe is pulled from the apparatus. In removing the shoe, the flash from the second injection-compression molding step may be torn from the shoe because of its attachment to the bead retained in the groove 36. In the eventuality that when the shoe is removed from the mold the flash is not torn off in the manner just described, such flash may thereafter easily be torn from the shoe along the weakened section 50 of the outsole rubber which connects the bead 48 to the outsole.

It will be understood, of course, that while the present invention has been illustrated with respect to a two color injection and apparatus, such is by way of example only. Thus, soles of three or more colors may be performed in accordance with the present invention. Additionally, the present invention can find suitable applications in the molding of rubber to articles other than shoes. Moreover, for the purposes of the present invention, it is not necessary that the rubber is admitted into the mold cavity by means of injection. Any other suitable methods for depositing the rubber in the mold cavity would be acceptable. It is therefore not intended to limit the present invention to the manufacture of footwear, nor solely to applications where the rubber is injected into the mold cavity. It will further be seen that the apparatus according to the present invention will be useful wherever rubber material is to be molded to an article in a mold which is so arranged that the article itself defines part of the mold cavity as well as to apparatus in which the mold cavity is defined completely by material not forming the finished article and the finished article is molded completely of rubber.

While there has been described herein the preferred form of the present invention and an alternative embodiment thereof, various changes and modifications may be made therein within the scope of the appended claims without departing from the spirit and scope of this invention.

What is claimed is:

1. In apparatus for molding a two colored sole into a tasted upper;
    a. a mold side ring for defining part of a mold cavity adapted to be closed at one end by a lasted upper;
    b. a sole plate slidably disposed in said mold cavity in close confronting relation with said side ring means;
    c. said sole plate having a surface for confronting said lasted upper and a side wall with a peripheral groove therewithin and a lip thereon between said lasted upper confronting surface and said groove, said lip extending toward and into close proximity with said side ring;

d. a first passage through said ring into said mold cavity for introducing rubber therewithin, e. a second passage through said ring into said mold cavity for introducing gas at high velocity into said mold cavity;

f. a third passage through said ring into said mold cavity at a point remote from said second passage for venting said gas from said mold cavity, whereby said gas will travel across said mold cavity; and g. means for moving said sole plate toward and away from said one end.

2. The apparatus of claim 1, wherein the mold cavity ends of said second and third passages are substantially coplanar and disposed further from said one end than the mold cavity end of said first passage.

3. The apparatus of claim 1, further comprising a fourth passage through said ring into said mold cavity for introducing a second rubber therewithin.

4. The apparatus of claim 2, wherein the mold cavity end of said fourth passage is closer to said one end than the mold cavity ends of said second and third passages and farther from said one end than the mold cavity end of said first passage.

5. The apparatus of claim 4, wherein said sole plate is movable to and from a remote position further from said one end than said second and third passages and from and to a close confronting position in which said lasted upper confronting surface is not closer to said one end than said first passage nor as far away from said one end as said fourth passage.

* * * * *